United States Patent
Inui et al.

(10) Patent No.: US 7,098,889 B2
(45) Date of Patent: Aug. 29, 2006

(54) SYSTEM AND METHOD FOR A SELF-CALIBRATING INPUT DEVICE

(75) Inventors: Takashi Inui, Yokohama (JP); Tetsuji Nakamura, Yokohama (JP)

(73) Assignee: Lenovo Pte. Ltd., Singapore (SG)

( * ) Notice: Subject to any disclaimer, the term of this patent is extended or adjusted under 35 U.S.C. 154(b) by 342 days.

(21) Appl. No.: 10/606,701

(22) Filed: Jun. 26, 2003

(65) Prior Publication Data

US 2004/0080489 A1   Apr. 29, 2004

(30) Foreign Application Priority Data

Jul. 10, 2002   (JP) .............................. 2002-201852

(51) Int. Cl.
*H03G 3/02*   (2006.01)
*G09G 5/00*   (2006.01)

(52) U.S. Cl. ...................... 345/156; 381/109
(58) Field of Classification Search ............... 345/157, 345/159, 173, 178, 163, 168, 171, 35, 156; 178/18.01, 18.03; 715/784, 785; 700/83–85; 463/36–39; 381/109

See application file for complete search history.

(56) References Cited

U.S. PATENT DOCUMENTS 5,910,798 A  *  6/1999  Kim .......................... 345/163
5,940,517 A  *  8/1999  Shinada et al. ............... 381/58

FOREIGN PATENT DOCUMENTS

JP           08162864 A   *   6/1996

* cited by examiner

*Primary Examiner*—Amr A. Awad
*Assistant Examiner*—Stephen Sherman
(74) *Attorney, Agent, or Firm*—Sawyer Law Group LLP

(57) ABSTRACT

A device, method, and computer program product for a self-calibrating input device are provided. The input device includes a designated value change unit operable to change a designated value using a variation amount associated with the designated value, the designated value being changed using a predetermined first variation amount when a first designated value change directive is received from an operator, and a variation amount change unit operable to alter the variation amount associated with the designated value from the predetermined first variation amount to a smaller second variation amount when a second designated value change directive that is opposite the first designated value change directive is received from the operator within a predetermined variation amount change period.

21 Claims, 13 Drawing Sheets

[Figure 1]
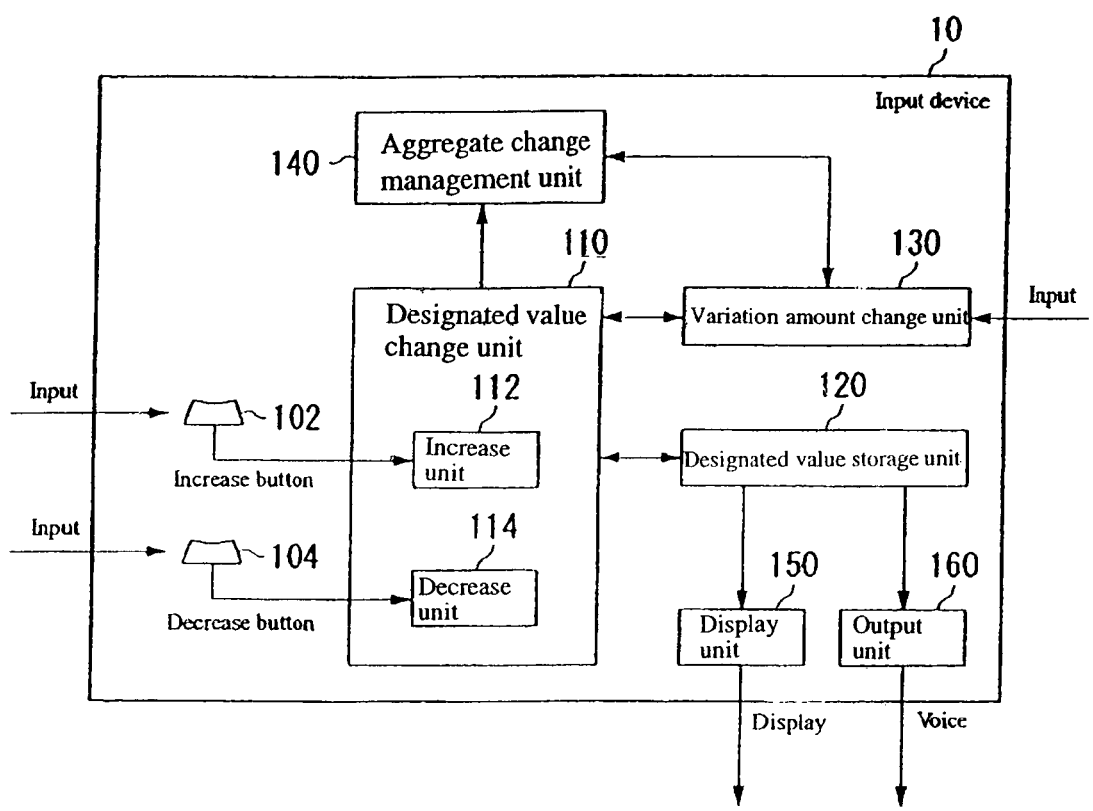

[Figure 2]
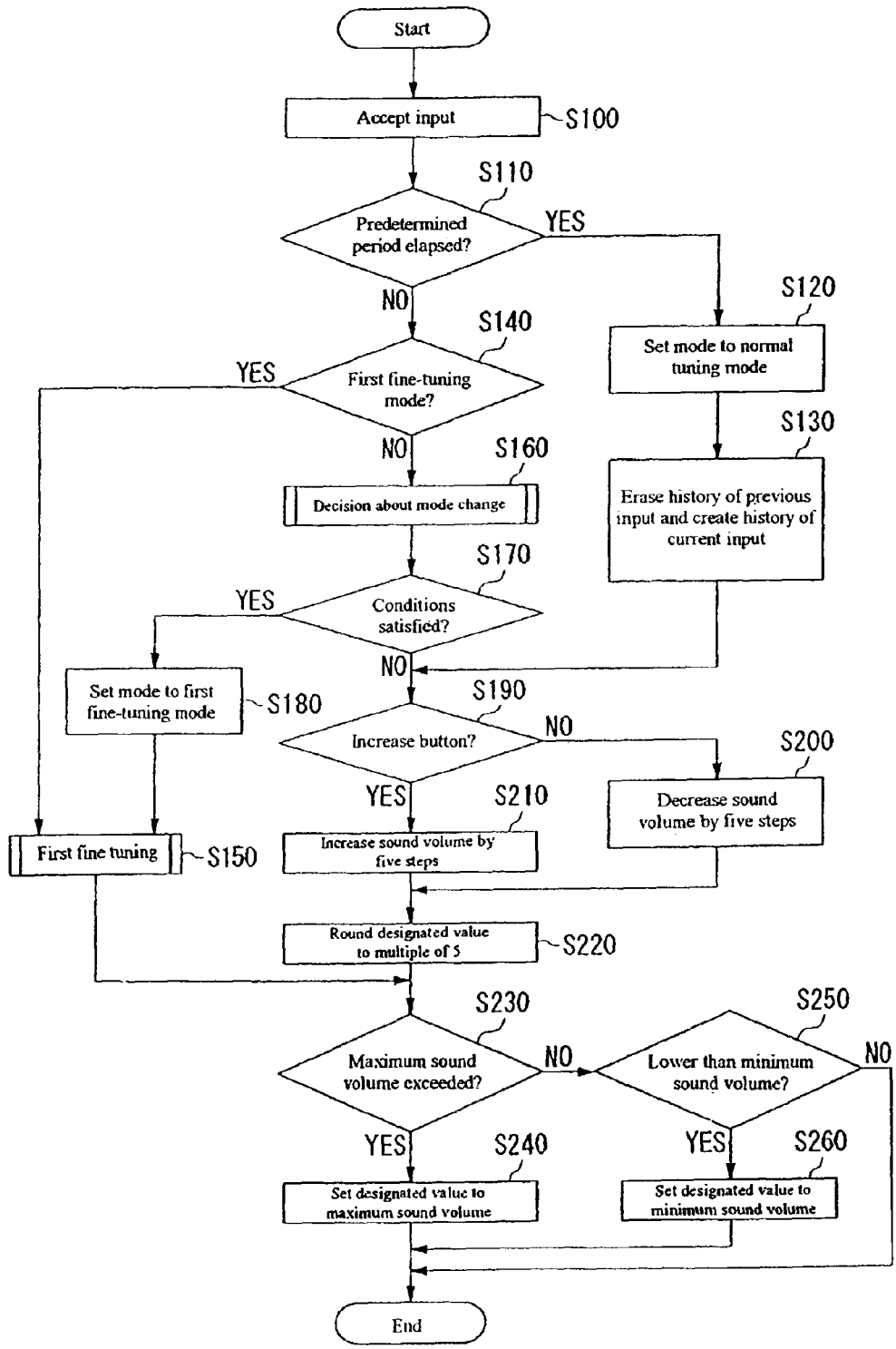

[Figure 3]
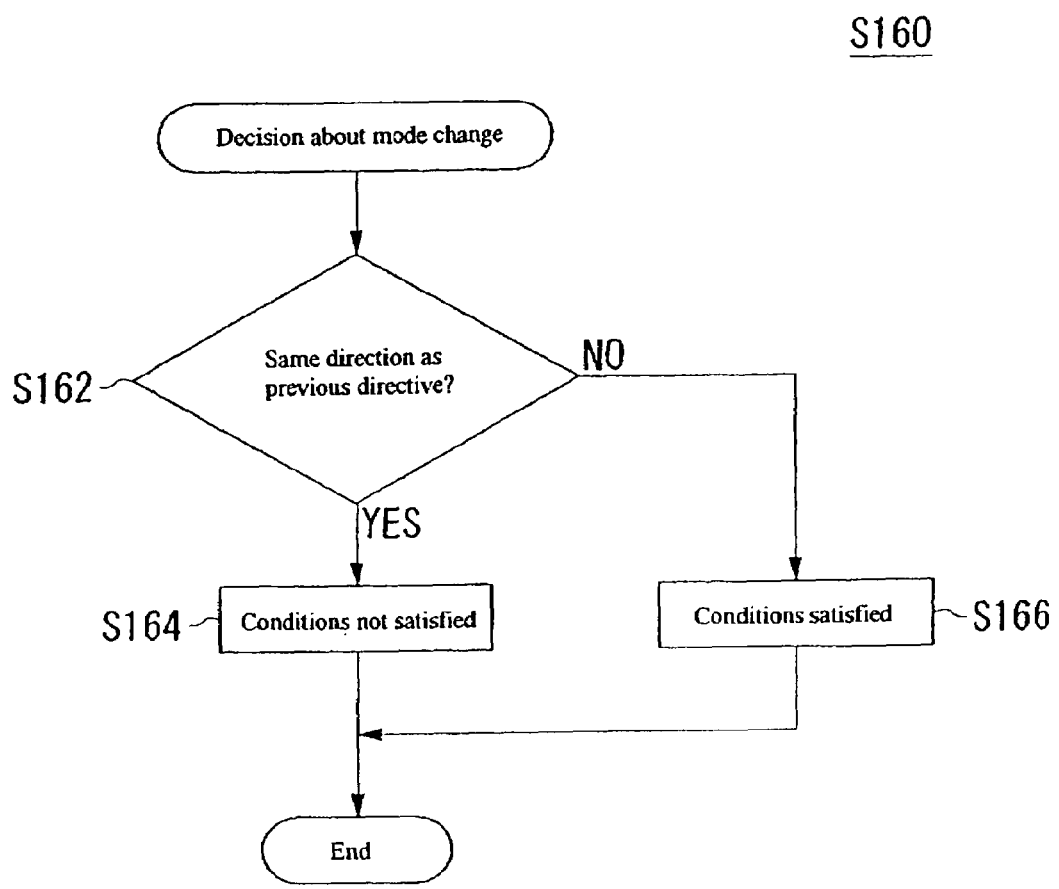

[Figure 4]
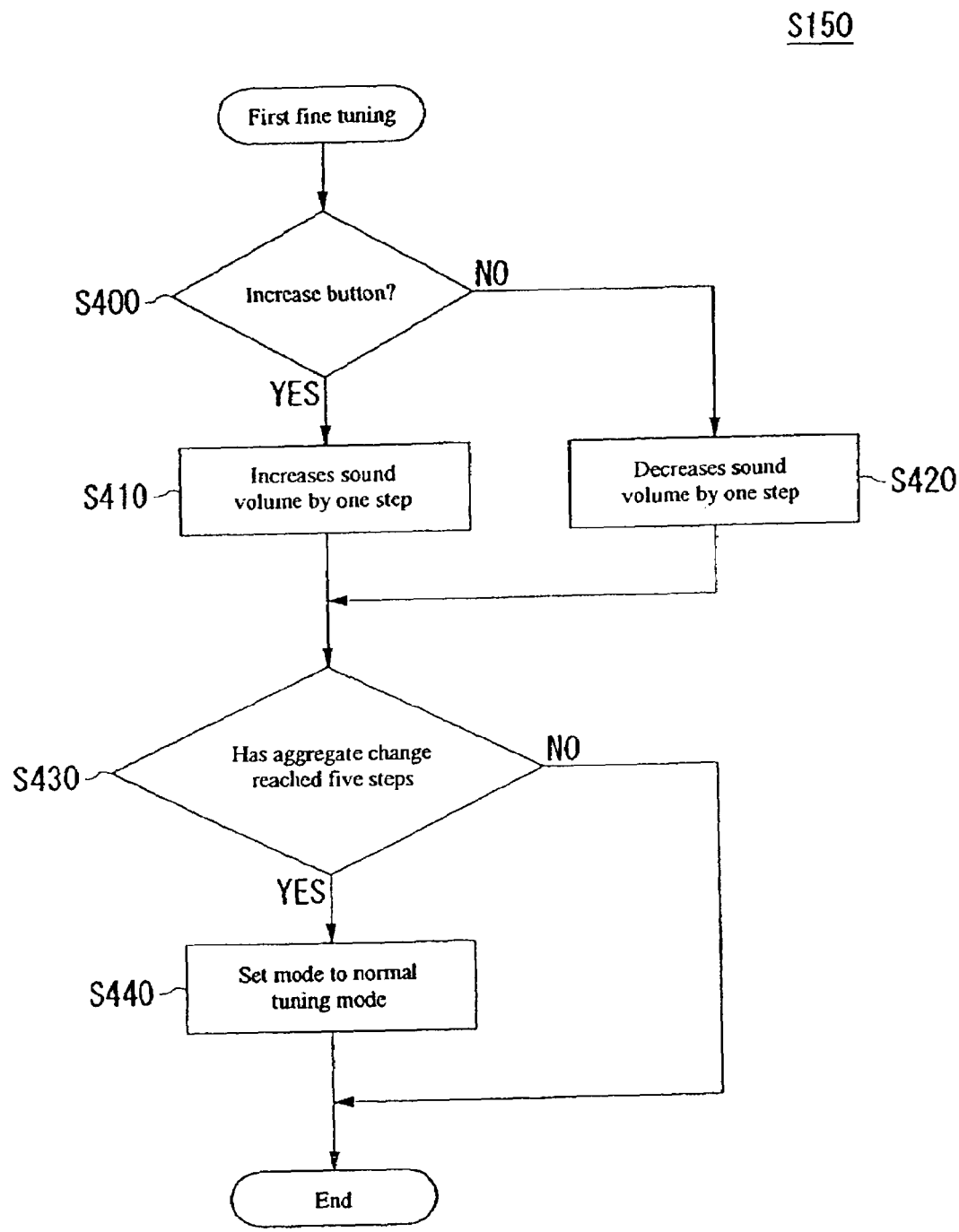

[Figure 5]
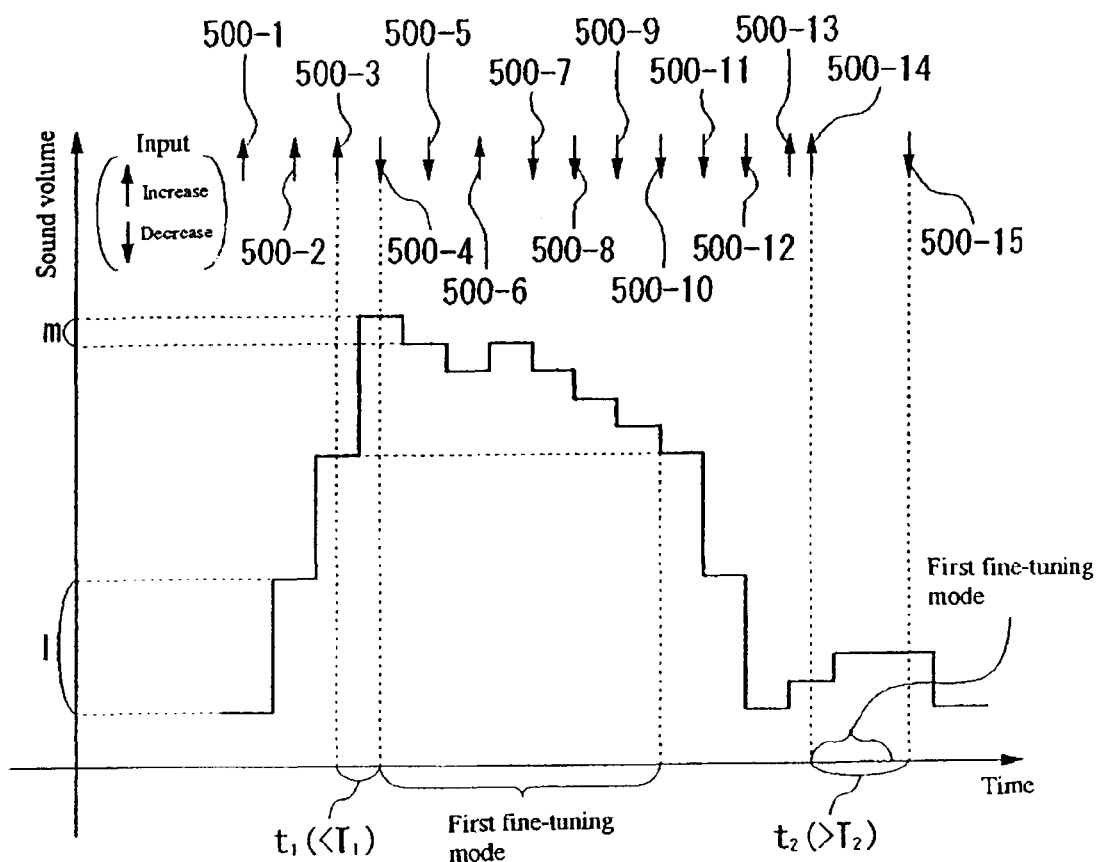

[Figure 6]
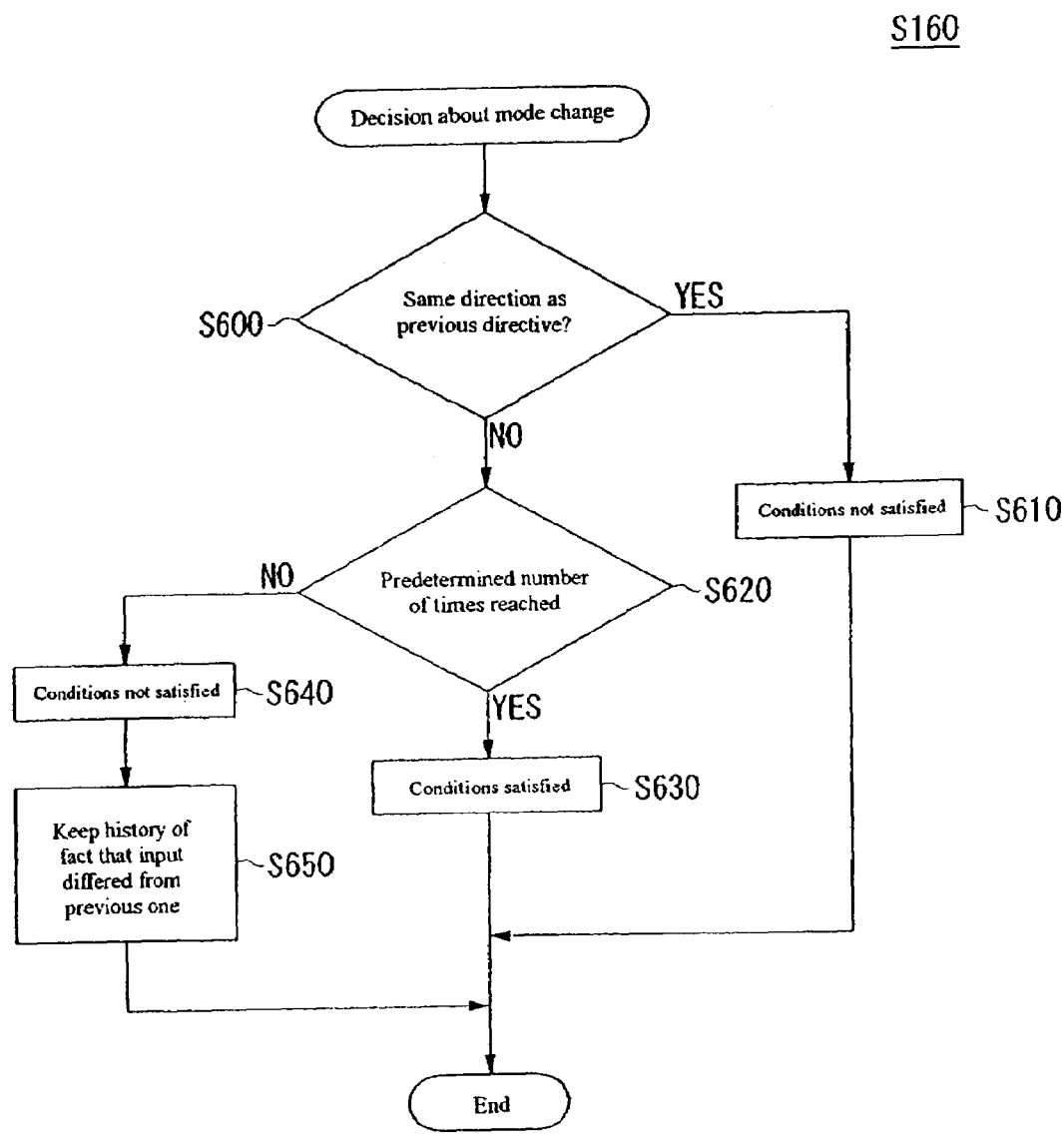

[Figure 7]
(A)
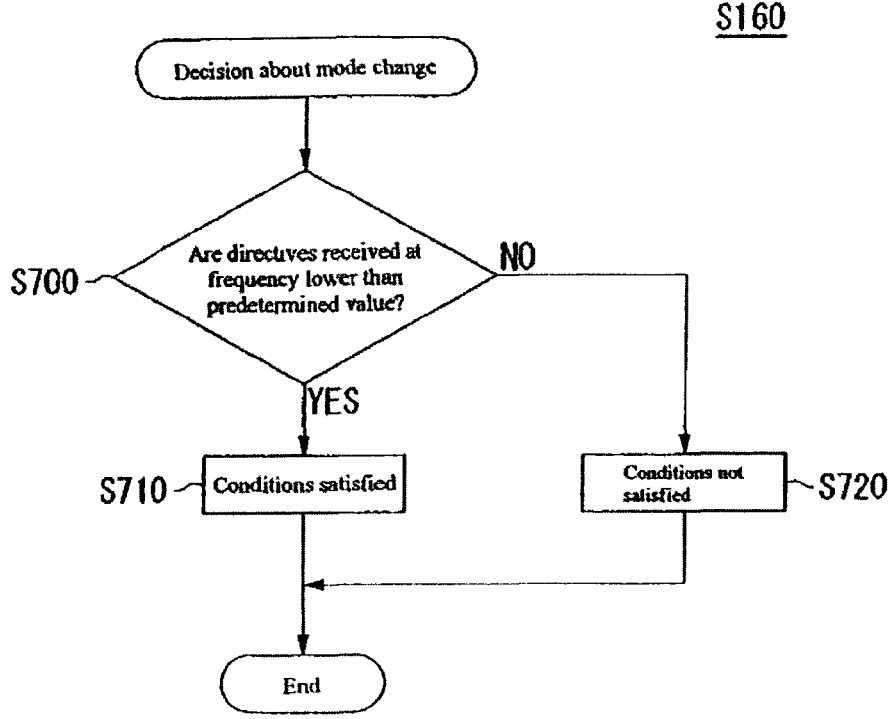
(B)
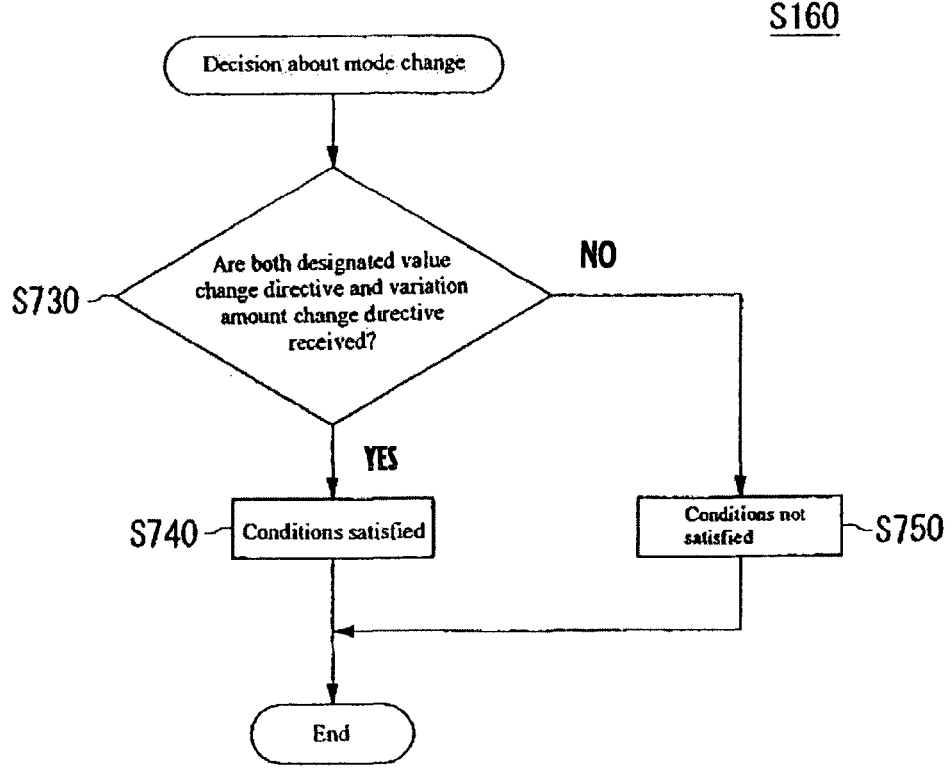

[Figure 8]
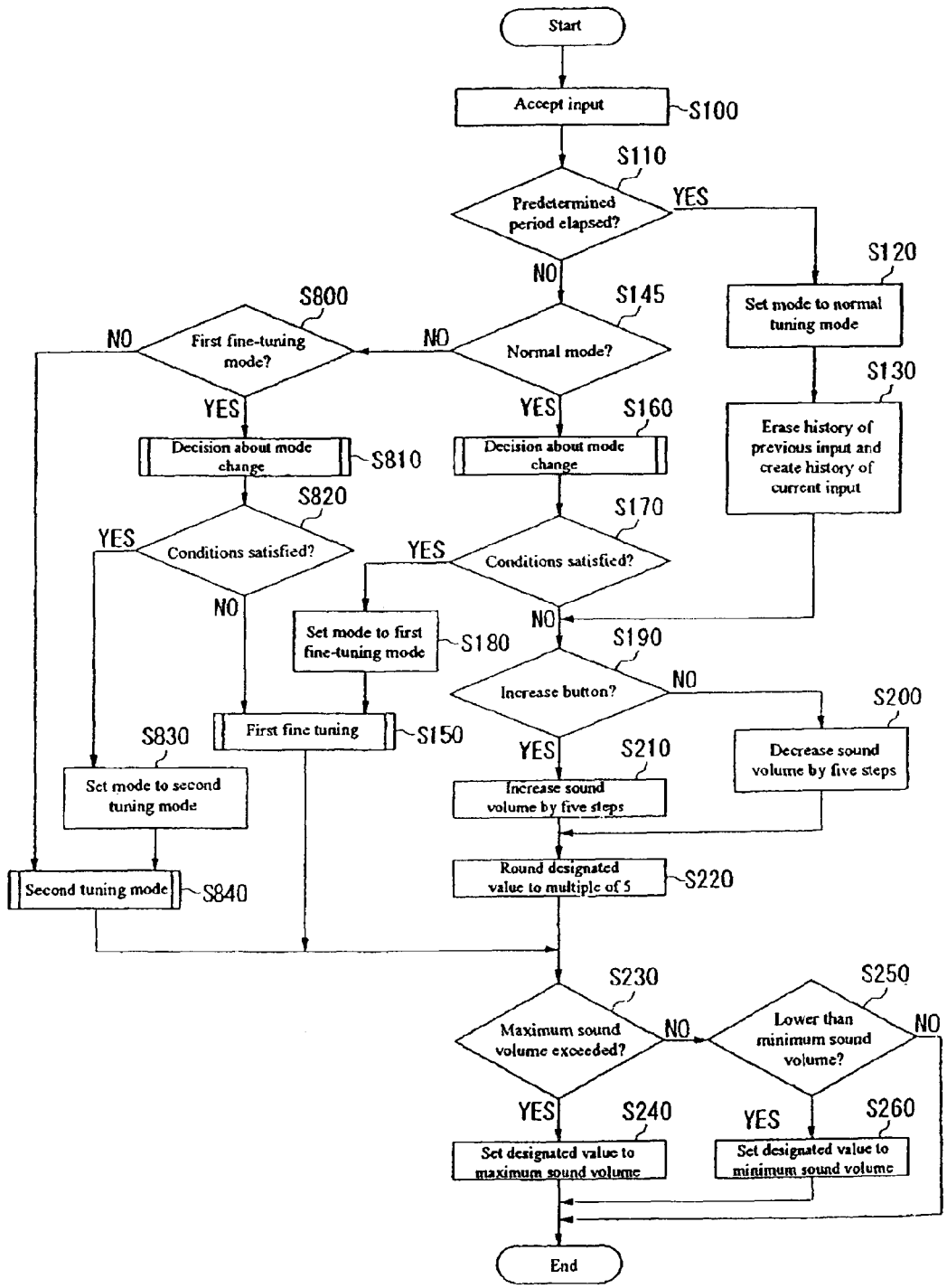

[Figure 9]
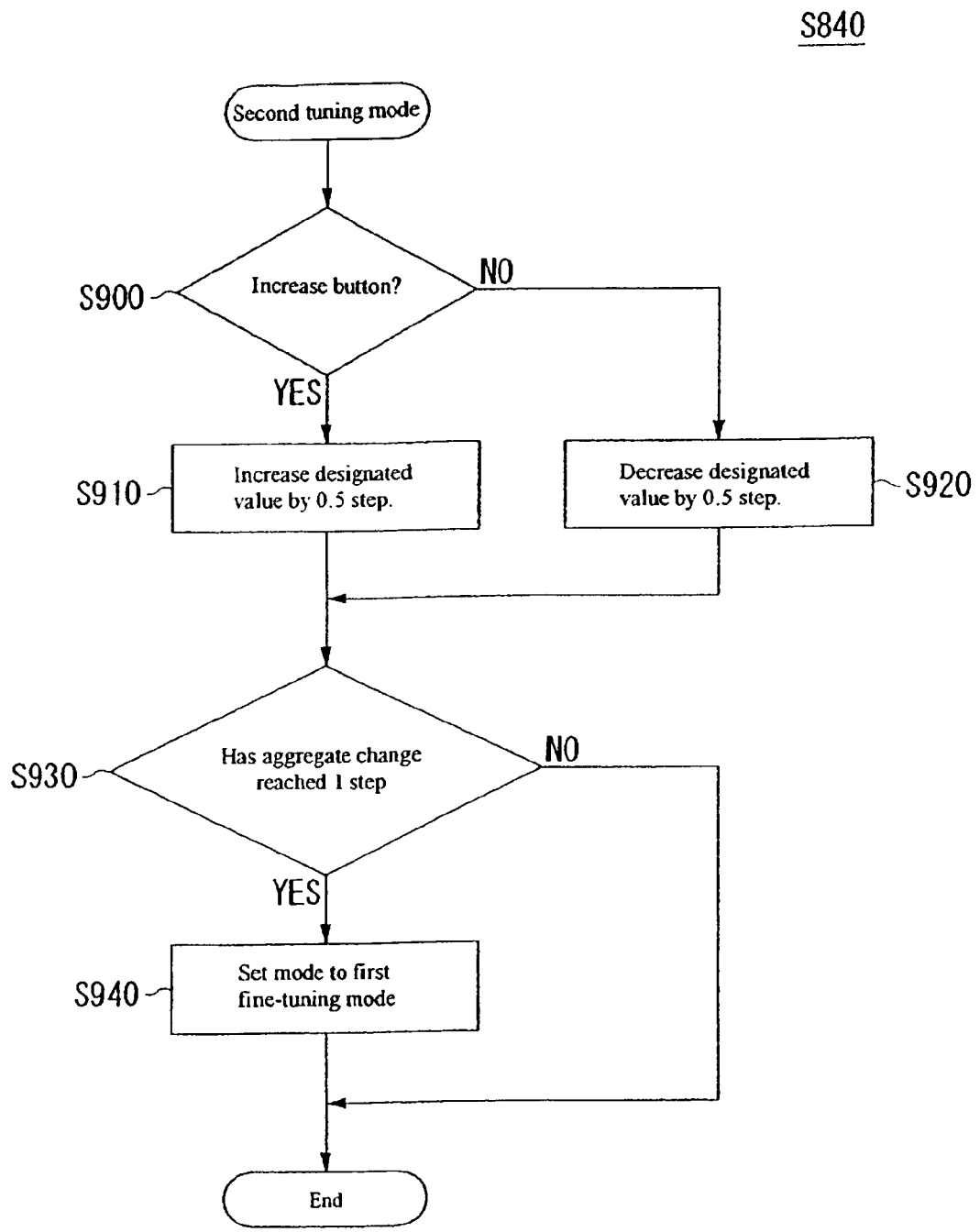

[Figure 10]
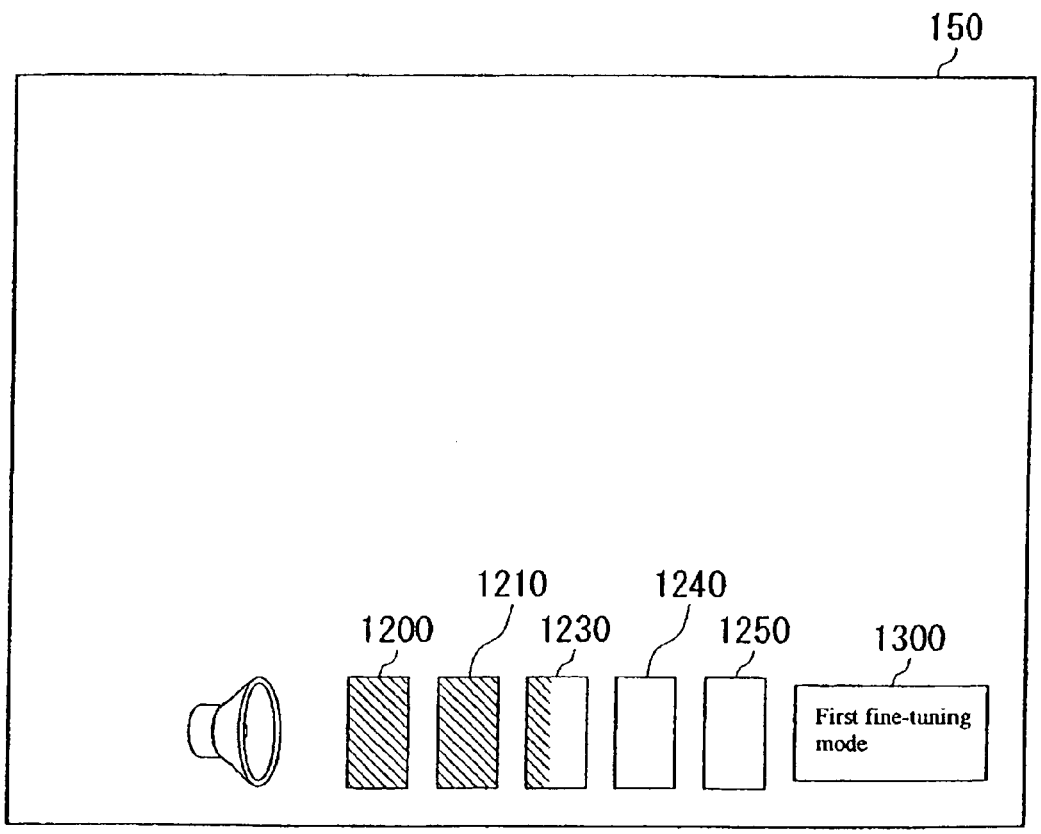

[Figure 11]
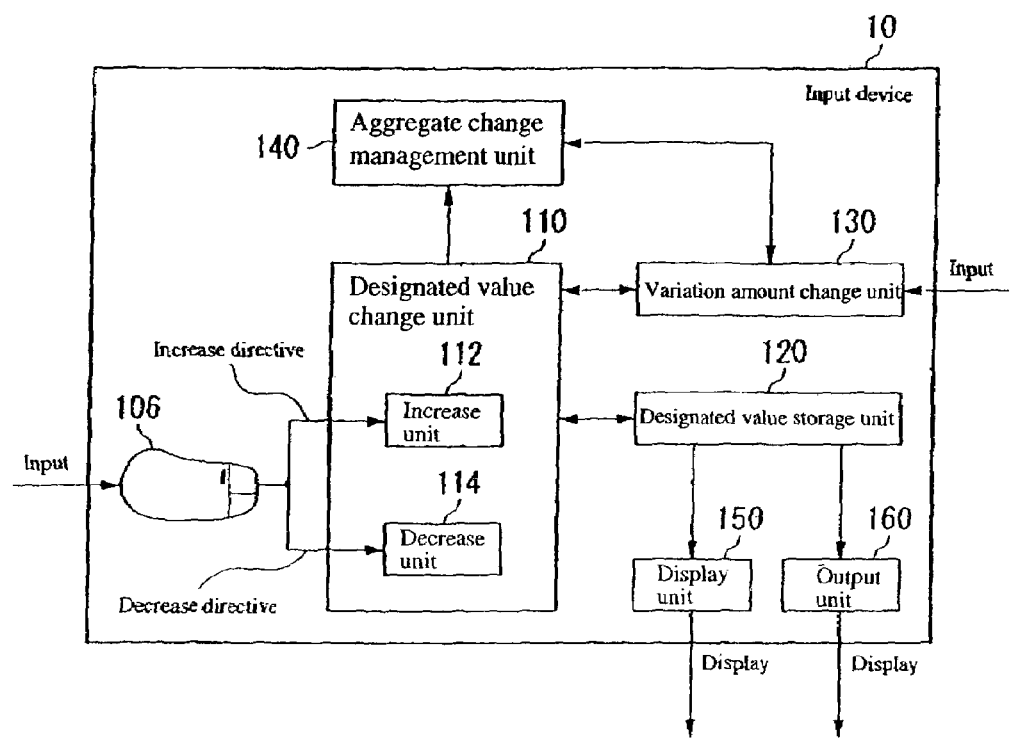

SYSTEM AND METHOD FOR A SELF-CALIBRATING INPUT DEVICE

BACKGROUND OF THE INVENTION

The present invention relates to an input device, input method, and program product. In particular, it relates to an input device, input method and program product which performs self-calibration or fine tuning of input values.

According to Published Unexamined Patent Application No. 7-274589, a device has been proposed that, when an operator increases or decreases a set value for use in controlling the device using operation keys, reduces the increasing or decreasing rate if a key indicating the reverse operation is pressed with a up/down key pressed. The device adjusts a variation rate in the same variation direction with a key that indicates an operation reverse of the direction.

The device, however, could not adjust the variation rate of a value when the set value is changed in the reverse direction.

The purpose of invention is therefore to provide an input device and a program product that can solve the above disadvantage. The purpose is attained by combination of features described in the independent claims following the Specification. Dependent claims define further advantageous examples of the invention.

SUMMARY OF THE INVENTION

The above purposes are accomplished by a combination of features as defined in independent claims in the scope of claims. Also, the dependent claims define preferable examples of the invention.

Specifically, a first form of the present invention provides an input device for inputting a designated value specified by an operator, comprising: a designated value change portion or unit for changing the designated value by a predetermined first variation amount when it receives a designated value change directive requesting the designated value to be changed; and a variation amount change unit that changes the variation amount in the designated value change unit to a second variation amount that is smaller than the first variation amount when it receives a directive for changing the designated value in a direction different from the direction by the designated value change directive within a predetermined variation amount change period after receiving the designated value change directive, and that maintains the variation amount in the designated value change unit as the first variation amount when it receives a directive for changing the designated value in a direction different from the direction by the designated value change directive after the variation amount change period has passed, as well as provides an input method, a program which implements the input device, and a recording medium containing the program.

Also, a second form of the present invention provides an input device for inputting a designated value specified by an operator, comprising: a designated value change unit for changing the designated value by a predetermined first variation amount when it receives a first designated value change directive requesting the designated value to be changed; and a variation amount change unit which, after receiving a second designated value change directive for changing the designated value in a direction different from that of the first designated value change directive, a third designated value change directive for changing the designated value in a direction different from that of the second designated value change directive, and a fourth designated value change directive for changing the designated value in a direction different from that of the third designated value change directive in sequence at intervals shorter than a predetermined variation amount change period, changes the variation amount for the fourth and later designated value change directives to a second variation amount smaller than the first variation amount, as well as provides an input method, a program which implements the input device, and a recording medium containing the program.

Incidentally, the above summary of the invention does not enumerate all the necessary features of the present invention, and subcombinations of above features can also constitute inventions.

BRIEF DESCRIPTION OF THE DRAWINGS

Some of the purposes of the invention having been stated, others will appear as the description proceeds, when taken in connection with the accompanying drawings, in which:

FIG. 1 is an exemplary block diagram of an input device 10;

FIG. 2 is a diagram showing an operations flow of the input device 10;

FIG. 3 is a diagram showing an operations flow of S160 in FIG. 2;

FIG. 4 is a diagram showing an operations flow of S150 in FIG. 2;

FIG. 5 is a graph showing changes in a designated value made by the input device 10;

FIG. 6 is a diagram showing how a decision about a mode change is made according to a first variation;

FIG. 7 is a diagram showing operations flows of how a decision about a mode change is made according to second and third variations;

FIG. 8 is a diagram showing an operations flow of the input device 10 according to a fourth variation;

FIG. 9 is a diagram showing an operations flow of S840 in FIG. 8;

FIG. 10 is a diagram showing an example of display presented by a display unit 150;

FIG. 11 is a diagram showing an exemplary functional block of the input device 10 according to a fifth variation;

DETAILED DESCRIPTION OF THE ILLUSTRATIVE EMBODIMENTS

Figure 12:
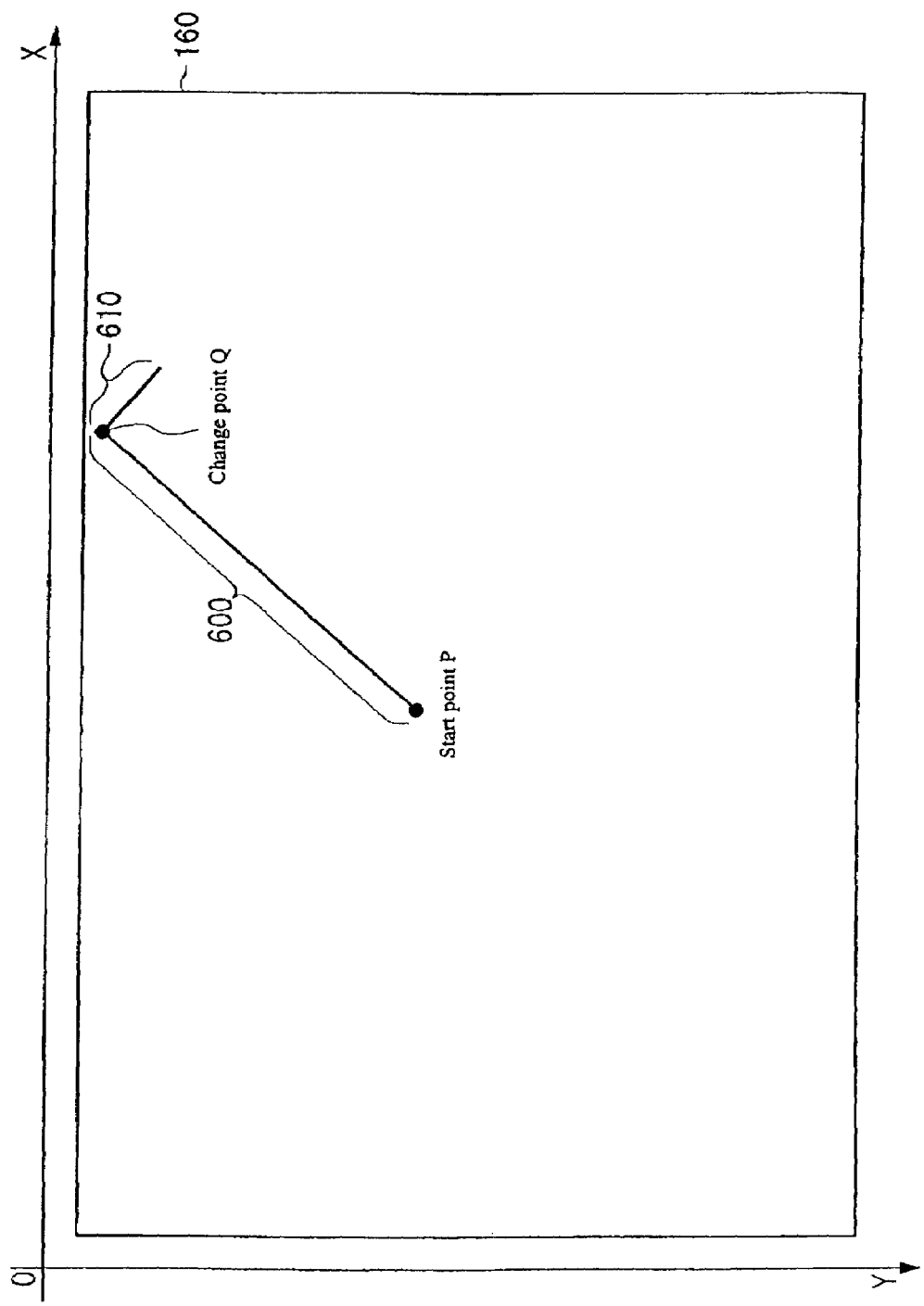
FIG. 12 is a diagram showing an example of output from an output unit 160 according to the fifth variation.

While the present invention will be described more fully hereinafter with reference to the accompanying drawings, in which the preferred embodiments of the present invention are shown, it is to be understood at the outset of the description which follows that persons of skill in the appropriate arts may modify the invention here described while still achieving the favorable results of this invention. These embodiments are not intended to limit the invention according to the Claims and all combinations of the features described in the embodiments are not necessarily fundamental for the solution of the invention.

Accordingly, the description which follows is to be understood as being a broad, teaching disclosure directed to persons of skill in the appropriate arts, and not as limiting upon the present invention.

Referring now more particularly to the accompanying drawings, FIG. 1 is an exemplary block diagram of an input device 10. The input device 10 is intended to allow designated values for equipment control to be input properly, making it convenient for an operator to adjust designated values as desired.

The input device 10 comprises an increase button 102, decrease button 104, designated value change unit 110, designated value storage unit 120, variation amount change unit 130, aggregate change management unit 140, display unit 150, and output unit 160. The increase button 102 accepts an increase directive, which is a designated value change directive, from the operator and sends it to the designated value change unit 110. The decrease button 104 accepts a decrease directive, which is a designated value change directive, from the operator and sends it to the designated value change unit 110. Incidentally, the increase button 102 and decrease button 104 may be keys on a keyboard or the like, switches, knobs, or combinations of a key, switch, and knob.

The designated value change unit 110 has an increase unit 112 and decrease unit 114. Upon accepting an increase directive from the increase button 102, the increase unit 112 increases a designated value stored in the designated value storage unit 120 by a predetermined first variation amount and sends the increase directive to the variation amount change unit 130. Similarly, upon accepting a decrease directive from the decrease button 104, the decrease unit 114 decreases a designated value stored in the designated value storage unit 120 by a predetermined first variation amount and sends the decrease directive to the variation amount change unit 130.

Each time the designated value is changed, the designated value change unit 110 sends the variation amount of the designated value to the aggregate change management unit 140. Also, upon receiving a variation amount change directive from the variation amount change unit 130, the designated value change unit 110 changes the variation amount of the designated value for the increase unit 112 and decrease unit 114 to a second variation amount smaller than the first variation amount.

The designated value storage unit 120, which stores a designated value, changes it according to directives from the designated value change unit 110. Then, the designated value storage unit 120 sends the designated value to the display unit 150 or output unit 160 at the request of the display unit 150 or output unit 160.

The variation amount change unit 130 receives an increase directive or decrease directive from the designated value change unit 110. Then, based on when the increase directive or decrease directive is received, the variation amount change unit 130 sends the designated value change unit 110 a variation amount change directive for changing the variation amount of the designated value for the designated value change unit 110 from the first variation amount to a second variation amount. In so doing, the variation amount change unit 130 sends a directive to the aggregate change management unit 140 requesting it to start managing aggregate change in the designated value. Based on the aggregate change in the designated value received from the aggregate change management unit 140, the variation amount change unit 130 changes the variation amount again from the second variation amount to the first variation amount. Alternatively, the variation amount change unit 130 may change the variation amount according to directives from outside.

Upon receiving the directive requesting it to start managing aggregate change in the designated value from the variation amount change unit 130, the aggregate change management unit 140 starts to receive variation amounts from the designated value change unit 110 and manages the aggregate change in the designated value. Then, each time the aggregate change in the designated value changes, the aggregate change management unit 140 sends the aggregate change in the designated value to the variation amount change unit 130.

The display unit 150 receives a designated value from the designated value storage unit 120 and displays it according to operator's directives. On the other hand, the output unit 160 receives the designated value from the designated value storage unit 120 and produces outputs according to the designated value. For example, the output unit 160 changes sound volume, pointer position, screen brightness, etc. according to the designated value.

In this way, when changing the designated value according to operator's directives, the input device 10 changes the designated value's variation amount for one directive of the operator according to the timing of the operator's directive. Thus, the input device 10 can fine-tune the designated value in response to operator actions, making it easy for the operator to adjust the designated value as desired.

FIG. 2 shows an operations flow of the input device 10. As described below, according to the timing of the operator's directive, the input device 10 switches between a normal tuning mode in which the designated value is changed by a first variation amount (e.g., 5 steps) each time a designated value change directive is received from the operator and a fine tuning mode in which the designated value is changed by 1 step each time a designated value change directive is received from the operator.

The designated value change unit 110 accepts a designated value change directive from the operator (S100). If it is determined that a designated value change directive has been received a predetermined variation amount change period after receiving the previous designated value change directive (S110: YES), the variation amount change unit 130 sets the input device 10 to normal tuning mode (S120), erases the history of the previous designated value change directive, and newly creates a history of the designated value change directive received in S100 (S130).

In this operations flow, the variation amount change period is similar to the one used in determining whether to change the variation amount from the second variation amount to the first variation amount again. In S110, decisions are made on both variation amount change period and variation amount retention period through a single comparison. Alternatively, the input device 10 may set the variation amount change period and variation amount retention period to different lengths and separately determine whether they have elapsed.

On the other hand, if it is determined that a designated value change directive is received within the predetermined variation amount change period after receiving the previous designated value change directive (S110: NO), the variation amount change unit 130 determines whether the input device 10 is set to first fine-tuning mode (S140). If it is (S140: YES), the input device 10 does first fine tuning (S150).

On the other hand, if it is determined that the input device 10 is not set to the first fine-tuning mode (S140: NO), the variation amount change unit 130 determines whether to change the mode (S160). If it is determined that conditions for a mode change are satisfied (S170: YES), the variation amount change unit 130 sets the input device 10 to the first fine-tuning mode (S180) and makes the input device 10 do first fine tuning (S150).

On the other hand, if it is determined that the conditions for a mode change are not satisfied (S170: NO), the designated value change unit 110 determines whether an increase directive is received as a designated value change directive from the increase button 102 (S190). If it is determined that no increase directive is received (S190: NO), the designated value in the designated value storage unit 120 is decreased by 5 steps (S200). On the other hand, if it is determined that an increase directive is received (S190: YES), the designated value change unit 110 increases the designated value in the designated value storage unit 120 by 5 steps (S210). Then, the input device 10 rounds up or off the changed designated value to a multiple of 5 (S220).

If it is determined that the changed designated value exceeds the maximum sound volume defined by a standard for the equipment which implements the input device 10 (S230: YES), the input device 10 sets the designated value to the maximum sound volume through subtraction (S240). If it is determined that the designated value does not exceed the maximum sound volume (S230: NO), the input device 10 determines whether the designated value is below a minimum value (S250). If it is below a minimum value (S250: YES), the designated value is set to the minimum value (S260).

FIG. 3 shows an operations flow of S160 in FIG. 2. The variation amount change unit 130 determines whether the direction of change in the designated value according to the variation amount change directive is the same as that of the previous variation amount change directive (S162). If it is determined that they are the same (S162: YES), the variation amount change unit 130 decides that the conditions for a mode change are not satisfied (S164), but if it is determined that they are not the same (S162: NO), the variation amount change unit 130 decides that the conditions for a mode change are satisfied (S166). The variation amount change unit 130 stores the information about whether or not the conditions for a mode change are satisfied, for use in subsequent processes.

FIG. 4 shows an operations flow of S150 in FIG. 2. The designated value change unit 110 determines whether an increase directive is received from the increase button 102 (S400). If it is determined that no increase directive is received (S400: NO), the designated value in the designated value storage unit 120 is decreased by a second variation amount (e.g., 1 step) (S420). If it is determined that an increase directive is received (S400: YES), the designated value change unit 110 increases the designated value in the designated value storage unit 120 by 1 step (S410). Then, when it is determined that the aggregate change in the designated value has reached 5 steps (S430: YES), the variation amount change unit 130 sets the input device 10 to normal tuning mode (S440). In determining whether the aggregate change in the designated value has reached 5 steps, the variation amount change unit 130 may use a residue operation (e.g., MOD operation) or the like to calculate whether the designated value is set at a multiple of 5 or a multiple of 5 plus 1.

As described above, the input device 10 can change the variation amount for the designated value change unit 110 to a second variation amount smaller than the first variation amount if it receives a designated value change directive for changing the designated value in a direction different from that of the previous designated value change directive within a variation amount change period after receiving the previous designated value change directive. On the other hand, the input device 10 can keep the variation amount for the designated value change unit 110 set at the first variation amount if it receives a designated value change directive for changing the designated value in a direction different from that of the previous designated value change directive after the variation amount change period has passed. Thus, the input device 10 can tune variation amount according to the timing of the operator's directive, making it easy for the operator to fine-tune the designated value.

By checking for the first fine-tuning mode in S140 before a decision about a mode change is made in S160 and S170, the input device 10 can change the variation amount of the designated value for both increase unit 112 and decrease unit 114 to the second variation amount if one of an increase directive and decrease directive is received within a predetermined period after the other of the increase directive and decrease directive is received.

FIG. 5 is a graph showing changes in a designated value made by the input device 10. Upon accepting designated value change directives 500-1 to 500-3, which are increase directives, the designated value change unit 110 increases sound volume, which is the designated value, by a first variation amount (I in the graph). If the variation amount change unit 130 receives a designated value change directive 500-4 for changing the designated value in a direction different from that of the designated value change directive 500-3 when t1 which is smaller than a variation amount change period T1 has elapsed after receiving the designated value change directive 500-3, it changes the variation amount for the designated value change directive to a second variation amount m (e.g., first fine-tuning mode) smaller than the first variation amount I. Consequently, upon receiving the designated value change directive 500-4, the designated value change unit 110 decreases the designated value by the second variation amount m. In the mean time, the aggregate change management unit 140 starts managing the aggregate change in the designated value set by the designated value change unit 110.

Then, the designated value change unit 110 changes the designated value by the second variation amount m in response to each of designated value change directives 500-5 to 500-10. When a designated value change directive 500-11 is received, the variation amount change unit 130 determines that the aggregate change in the designated value, i.e., the sum total of the changes in the designated value caused by the designated value change directives 500-5 to 500-11 has exceeded the first variation amount I and changes the designated value for the designated value change unit 110 again to the first variation amount I (e.g., normal mode). Thus, the designated value change unit 110 changes the designated value by the first variation amount I in response to each of designated value change directives 500-11 to 500-12.

Alternatively, the aggregate change management unit 140 may manage the cumulative value of changes in the designated value instead of the aggregate change in the designated value. In that case, the designated value change unit 110 will change the designated value to the first variation amount again when the cumulative value exceeds a predetermined value such as the first variation amount.

When the variation amount change unit 130 receives a designated value change directive 500-13, an increase directive different from the designated value change directive 500-12, it changes the variation amount from the first variation amount I to the second variation amount m (e.g., first fine-tuning mode). Thus, the designated value change unit 110 changes the designated value by the second variation amount m in response to each of designated value change directives 500-13 to 500-14.

If the variation amount change unit 130 receives a designated value change directive 500-15 when t2 which is larger than a variation amount change period T2 has passed after receiving the previous designated value change directive 500-14, it changes the variation amount for the designated value change unit 110 from the second variation amount m to the first variation amount I. Thus, the designated value change unit 110 sets the designated value to a multiple of I (e.g., a multiple of 5) by subtracting the first variation amount I from the designated value and rounding up the numeral of the designated value. As a result, the input device 10 returns the designated value to the value used before the above operations.

As described above, the input device 10 makes it possible to fine-tune a designated value used to set an output quantity such as sound volume and allows the operator to specify a desired value. Furthermore, the input device 10 can finish fine tuning with the appropriate timing in response to an operator action and return to normal operation.

In the Figure, the designated value change unit 110 changes the designated value each time the increase button 102 or decrease button 104 is pressed. Alternatively, the designated value may be varied continuously while the increase button 102 or decrease button 104 are pressed and held. In other words, the increase button 102 or decrease button 104 sends designated value change directives periodically to the designated value change unit 110 while being pressed and held by the operator. The designated value change unit 110 changes the designated value according to the designated value change directives received periodically.

FIG. 6 shows how a decision about a mode change is made according to a first variation. A functional block according to this variation is nearly the same as the functional block shown in FIG. 1, and thus description thereof will be omitted. Also, an operations flow according to this variation differs from the operations flow shown in FIG. 2 only in "decision about mode change" in S160, and only the difference will be described.

The variation amount change unit 130 determines whether the direction of change in the designated value according to this variation amount change directive is the same as that of the previous variation amount change directive (S600). If it is determined that they are the same (S600: YES), the variation amount change unit 130 decides that the conditions for a mode change are not satisfied (S610). If it is determined that they are not the same (S600: NO), the variation amount change unit 130 determines whether the number of times the designated value is requested to be changed in a direction different from that of the previous designated value change directive has reached a predetermined number of times, for example, three times (S620).

If it is determined that the number has reached three times (S620: YES), the variation amount change unit 130 decides that the conditions for a mode change are satisfied (S630).

On the other hand, if it is determined that the number has not reached three times (S620: NO), the variation amount change unit 130 decides that the conditions for a mode change are not satisfied (S640) and keeps a history of the fact that the direction of change in the designated value according to this variation amount change directive was different from that of the previous variation amount change directive (S650).

Thus, if the variation amount change unit 130 receives a first designated value change directive requesting the designated value to be changed, a second designated value change directive for changing the designated value in a direction different from that of the first designated value change directive, a third designated value change directive for changing the designated value in a direction different from that of the second designated value change directive, and a fourth designated value change directive for changing the designated value in a direction different from that of the third designated value change directive in sequence at intervals shorter than a predetermined variation amount change period, the variation amount change unit 130 changes the variation amount for the fourth and later designated value change directives to a second variation amount smaller than the first variation amount.

For example, if a decrease directive, increase directive, and decrease directive are received in sequence when the designated value is being increased according to an increase directive, the variation amount change unit 130 decides that the conditions for a first fine-tuning mode change are satisfied. Thus, in FIG. 2, the input device 10 can delay the timing to set the first fine-tuning mode compared to when the method shown in FIG. 3 is used. This enhances the convenience for operators or the line who are unfamiliar with button operation.

FIG. 7 shows operations flows of how a decision about a mode change is made according to second and third variations. FIG. 7(A) shows a decision about a mode change according to the second variation while FIG. 7(B) shows a decision about a mode change according to the third variation. Functional blocks according to variations in FIG. 7 are nearly the same as the functional block shown in FIG. 1, and thus description thereof will be omitted. Also, the operations flows according to the variations in FIG. 7 differ from the operations flow shown in FIG. 2 only in "decision about mode change" in S160, and only the differences will be described.

In FIG. 7(A), if it is determined that frequency at which designated value change directives are received is lower than a predetermined value (S700: YES), the variation amount change unit 130 decides that the conditions for a mode change are satisfied (S710), but if it is determined that frequency at which designated value change directives are received is higher than the predetermined value (S700: NO), it decides that the conditions for a mode change are not satisfied (S720). For example, when the predetermined value is an interval of 0.5 second, if designated value change directives are received at intervals shorter than 0.5 second, the variation amount change unit 130 determines that the designated value change directives are received at a frequency higher than the predetermined value, but if designated value change directives are received at intervals not shorter than 0.5 second but shorter than 2 seconds, the variation amount change unit 130 determines that the designated value change directives are received at a frequency lower than the predetermined value.

When designated value change directives are received at a frequency lower than a predetermined frequency, the variation amount change unit 130 may change the variation amount for the designated value change unit 110 to a second variation amount smaller than a first variation amount.

In FIG. 7(B), if it is determined that both a designated value change directive and an external directive for changing the variation amount for the designated value change unit 110 are received (S730: YES), the variation amount change unit 130 decides that the conditions for a mode change are satisfied (S740). On the other hand, if it is determined that both a designated value change directive and an external directive for changing the variation amount for the designated value change unit 110 are not received (S730: NO), the variation amount change unit 130 decides that the conditions for a mode change are not satisfied (S750). Incidentally, as the external directive for changing the variation amount for the designated value change unit 110, the variation amount change unit 130 may detect press of a button other than the increase button 102 and decrease button 104. Regarding the other button, the variation amount change unit 130 may detect press of the shift key, control key, or the like used for keyboard combinations.

In this way, when the variation amount change unit 130 receives both a directive for changing the variation amount for the designated value change unit 110 and a designated value change directive, it may change the variation amount for the designated value change unit 110 to a second variation amount smaller than the first variation amount.

FIG. 8 shows an operations flow of the input device 10 according to a fourth variation. A functional block in this figure is nearly the same as the functional block shown in FIG. 1, and thus description thereof will be omitted. Also, the operations flow in this figure newly contains S145, a determination process, instead of S140 contained in the operations flow of FIG. 2. The process performed when the answer in S145 is YES is nearly the same as the process performed when the answer in S140 in FIG. 2 is NO, and thus description thereof will be omitted. Description will be given of only the process performed when the answer in S145 is NO.

If the input device 10 determines that it is not in normal mode (S145: NO), it determines whether it is in first fine-tuning mode (S800). If the input device 10 determines that it is not in first fine-tuning mode (S800: NO), it performs a process of second tuning to change the designated value in increments of 0.5 (S840). If the input device 10 determines that it is in first fine-tuning mode (S800: YES), it performs a decision process for a mode change (S810). The decision process for a mode change here is the same as the decision process for a mode change in S160 in FIG. 3, and thus description thereof will be omitted.

If the variation amount change unit 130 determines that the conditions are not satisfied (S820: NO), it makes a first fine-tuning process performed (S150). If the variation amount change unit 130 determines that the conditions are satisfied (S820: YES), it sets the input device 10 to second tuning mode (S830) and makes the second tuning performed (S840).

FIG. 9 shows an operations flow of S840 in FIG. 8. The designated value change unit 110 determines whether an increase directive has been received from the increase button 102 (S900). If it is determined that no increase directive has been received (S900: NO), the designated value change unit 110 decreases the designated value in the designated value storage unit 120 by a third variation amount (e.g., 0.5 step) (S920). If it is determined that an increase directive has been received (S900: YES), the designated value change unit 110 increases the designated value in the designated value storage unit 120 by 0.5 step (S910). Then, when the variation amount change unit 130 determines that the aggregate change in the designated value has reached 1 step (S930: YES), it sets the input device 10 to the first fine-tuning mode (S940).

Incidentally, in S930, the variation amount change unit 130 may determine whether the aggregate change in the designated value has reached 5 steps. In that case, the variation amount change unit 130 sets the input device 10 to normal mode.

When the variation amount for the designated value change unit 110 has been set to the second variation amount, if the variation amount change unit 130 receives a designated value change directive for changing the designated value in a direction different from that of the previous designated value change directive within a variation amount change period after receiving the previous designated value change directive, it may change the variation amount for the designated value change unit 110 to a third variation amount smaller than the second variation amount.

Furthermore, a fourth variation amount smaller than the third variation amount may be provided in the input device 10 to allow further fine tuning of the designated value. In that case, the input device 10 will allow the operator to tune the designated value more accurately.

FIG. 10 shows an example of display presented by the display unit 150. The display unit 150 displays information about changes in sound volume which is a designated value or changes in the variation amount on screen.

For example, the display unit 150 presents a speaker symbol to indicate that the designated value is sound volume. The display unit 150 displays a block 1200 and block 1210 which indicate the designated value at the level of the first variation amount as well as a block 1230 which indicates the designated value at the level of the second variation amount by coloring only part of the block. For example, to indicate the magnitude of the designated value, the display unit 150 colors the block 1200 and block 1210 each of which corresponds to 5 steps. The display unit 150 colors ⅖ of the block 1230 to indicate additional 2 steps.

The display unit 150 keeps a block 1240 and block 1250 blank to indicate that the designated value is not that large. Using the above information, the display unit 150 shows that the magnitude of the designated value is 12 steps.

Besides, as information about the variation amount of the designated value, the display unit 150 displays mode information 1300. In this case, the display unit 150 indicates that the current variation amount of the designated value is the second variation amount which corresponds to the first fine-tuning mode (e.g., 1 step).

In this way, when the object controlled by means of a designated value cannot be recognized visually as is the case with sound volume, the display unit 150 can provide an easy-to-use environment to the operator by displaying the designated value and its variation amount on screen.

FIG. 11 shows an exemplary functional block of the input device 10 according to a fifth variation. In the figure, the designated value change unit 110, increase unit 112, decrease unit 114, designated value storage unit 120, variation amount change unit 130, aggregate change management unit 140, display unit 150, and output unit 160 are nearly the same as the components denoted by the same reference numerals in FIG. 1, and thus only differences will be described here.

The input device 10 further comprises a mouse 106.

When moved by the operator, the mouse 106 sends the amount of travel in a predetermined axial direction as an increase directive or decrease directive to the increase unit 112 or decrease unit 114. For example, when moved vertically by the operator, the mouse 106 sends the increase unit 112 the amount of travel in the Y-axis direction as an increase directive concerning the designated value. Consequently, the designated value change unit 110 increases the designated value by the first variation amount and the output unit 160 changes the display position of an image or the like according to the increase in the designated value to respond to the movement of the mouse. Incidentally, the mouse 106 may also be connected to a device approximately equivalent to the input device 10. For example, when the input device 10 controls the movement of the mouse 106 in the X-axis direction, the device approximately equivalent to the input device 10 will control the movement of the mouse 106 in the Y-axis direction.

FIG. 12 shows an example of output from the output unit 160 according to the fifth variation. According to this variation, the designated value is the display position of an image pointed to on a screen with a mouse 106 pointer by the operator. In this case, the input device 10 changes the variation amount of the designated value from a first variation amount to the second variation amount if the display position switches its direction of change on a certain axis.

For example, the mouse 106 accepts a directive for increasing the Y coordinate of the display position of the mouse pointer as an increase directive and accepts a directive for decreasing the Y coordinate of the display position of the mouse pointer as a decrease directive.

If the mouse 106 accepts an increase directive when the mouse pointer is located at a start position P, the output unit 160 moves mouse pointer by the first variation amount along a pointer locus 600. Then, if the mouse 106 accepts a decrease directive within a predetermined variation amount change period after the mouse pointer reaches a change point Q, the input device 10 is set to the first fine-tuning mode. That is, the output unit 160 increases the Y coordinate of the mouse pointer by the second variation amount smaller than the first variation amount along a pointer locus 610.

Incidentally, after the mouse pointer reaches the change point Q, the output unit 160 may change the variation amount of the mouse pointer on the X coordinate from the first variation amount to the second variation amount. Thus, the input device 10 slows the movement of the mouse pointer to fine-tune its position in the output unit 160.

In another example of controlling the display position of a mouse pointer or the like, the input device 10 may use traveling speed or acceleration of the mouse pointer or the like as a designated value. Specifically, the input device 10 may change a variation amount for the designated value change unit 110 according to changes in the speed or acceleration. Also, the input device 10 may use a differential value or quadratic differential value of a graph drawn by a pointer locus on a coordinate plane in the output unit 160 as a designated value. That is, the input device 10 may change a variation amount for the designated value change unit 110 according to changes in the differential value or quadratic differential value of a graph drawn by a pointer locus.

Figure 13:
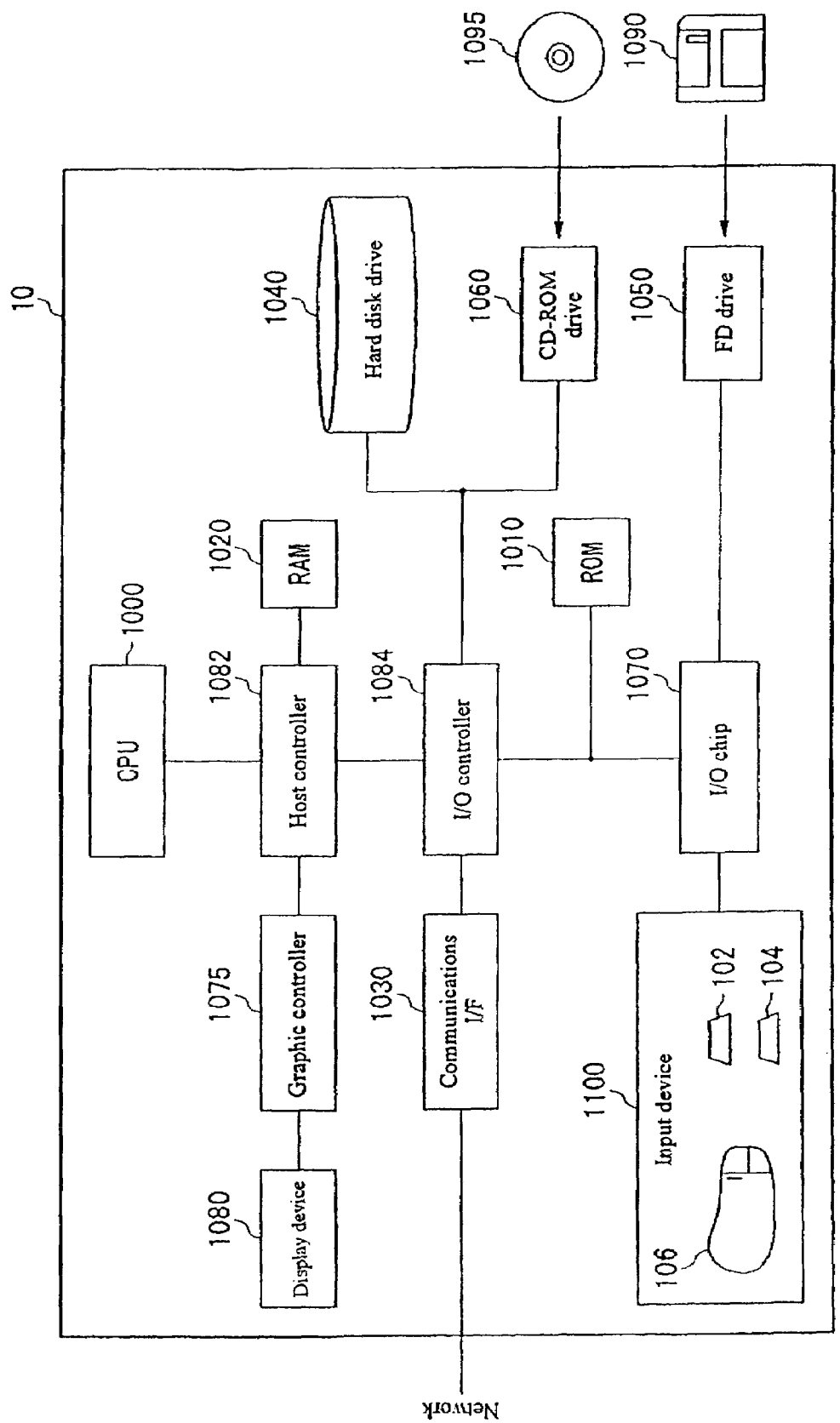
FIG. 13 is a diagram showing an exemplary hardware configuration according to the embodiment and variations.

FIG. 13 shows an exemplary hardware configuration of the input device 10 according to the embodiment and variations. The input device 10 according to this embodiment has a CPU peripheral unit, input/output unit, and legacy input/output unit. The CPU peripheral unit comprises a CPU 1000, RAM 1020, graphic controller 1075, and display device 1080 connected via a host controller 1082. The input/output unit comprises communications interface 1030 connected to the host controller 1082 via an input/output controller 1084, hard disk drive 1040, and CD-ROM drive 1060. The legacy input/output unit comprises a ROM 1010 connected to the input/output controller 1084, flexible disk drive 1050, and input/output chip 1070.

The host controller 1082 connects the RAM 1020 with the CPU 1000 and graphic controller 1075 which access the RAM 1020 at a high transfer rate. The CPU 1000 operates based on programs stored in the ROM 1010 and RAM 1020 and controls various parts. The graphic controller 1075 acquires image data generated in a frame buffer provided by the CPU 1000 and the like in the RAM 1020 and displays it on the display device 1080. Alternatively, the graphic controller 1075 may contain a frame buffer to store image data generated by the CPU 1000 and the like.

The input/output controller 1084 connects the host controller 1082 with the communications interface 1030 which is a relatively high-speed input/output device, the hard disk drive 1040, and the CD-ROM drive 1060. The communications interface 1030 communicates with other devices via a network. The hard disk drive 1040 stores programs and data for use by the input device 10. The CD-ROM drive 1060 reads programs or data from a CD-ROM 1095 and provides them to the input/output chip 1070 via the RAM 1020.

The input/output controller 1084 is connected with the ROM 1010 as well as with relatively low-speed input/output devices such as the flexible disk drive 1050 and the input/output chip 1070. The ROM 1010 stores a boot program executed by the CPU 1000 during startup of the input device 10, and programs dependent on hardware of the input device 10. The flexible disk drive 1050 reads programs or data from a flexible disk 1090 and provides them to the input/output chip 1070 via the RAM 1020. The input/output chip 1070 connects with the flexible disk 1090 as well as with various input/output devices via, for example, a parallel port, serial port, keyboard port, mouse port, etc. Also, the input/output chip 1070 receives data corresponding to user input through the increase button 102, decrease button 104, and mouse 106 of an input device 1100 and provides the data to programs executed by the input device 10.

Programs are supplied to the input device 10 by the operator, being stored on a recording medium such as a flexible disk 1090, CD-ROM 1095, or IC card. Then, the programs are read from the recording medium, installed in the input device 10, and executed. Also, the input device 10 may provide series of encoded data generated by encoding device, not shown, and stored on a recording medium to the operator.

A program which implements the input device 10 comprises a designated value change, module increase module, decrease module, designated value storage module, variation amount change module, aggregate change management module, display module, and output module. These modules make the input device 10 operate as the designated value change unit 110, increase unit 112, decrease unit 114, designated value storage unit 120, variation amount change unit 130, aggregate change management unit 140, display unit 150, and output unit 160.

The program or modules described above may be stored on an external storage medium. Available storage media include optical recording media such as DVD and PD, magneto-optical recording media such MD, tape media, semiconductor memories such as IC cards in addition to the flexible disk 1090 and CD-ROM 1095. Also, the program may be supplied to the input device 10 via a network using a storage device such as a hard disk or RAM as a recording medium with the storage device installed in a server system connected to a private communications network or the Internet. Besides, the program or modules may be mounted on an integrated circuit such as an ASIC or implemented as firmware.

As can be seen from the above description, the input device 10 allows designated values used for equipment control to be input properly. In particular, the input device 10 can fine-tune designated values in response to operator actions, making it easy for the operator to adjust the designated values as desired.

The present invention has been described above by way of the embodiment of the present invention, but the technical scope of the present invention is not limited to the above embodiment. Various modifications and improvements may be made to the above embodiment. Such modifications and improvements are to be understood as included within the scope of the present invention as defined by the appended Claims.

We claim:

1. An input device comprising:
   a designated value change unit operable to change a designated value using a variation amount associated with the designated value, the designated value being changed using a predetermined first variation amount when a first designated value change directive is received from an operator; and
   a variation amount change unit operable to alter the variation amount associated with the designated value from the predetermined first variation amount to a smaller second variation amount when a second designated value change directive that is opposite the first designated value change directive is received from the operator within a predetermined variation amount change period,
   wherein the variation amount change unit is further operable to restore the variation amount associated with the designated value from the smaller second variation amount back to the predetermined first variation amount when a variation amount retention period lapses after a previous designated value change directive is received from the operator.

2. The input device of claim 1, wherein the designated value change unit comprises:
   an increase unit operable to increase the designated value using the variation amount associated with the designated value when an increase directive is received from the operator; and
   a decrease unit operable to decrease the designated value using the variation amount associated with the designated value when a decrease directive is received from the operator,
   wherein the first designated value change directive is one of the increase directive and the decrease directive and the second designated value change directive is the other of the increase directive and the decrease directive.

3. The input device of claim 2, further comprising:
   an increase button operable to allow the operator to input the increase directive; and
   a decrease button operable to allow the operator to input the decrease directive.

4. The input device of claim 1, further comprising:
   a display unit operable to visually display information about changes in the designated value or changes in the variation amount associated with the designated value.

5. The input device of claim 1, further comprising:
   an aggregate change management unit operable to manage an aggregate change in the designated value when the variation amount associated with the designated value is altered from the predetermined first variation amount to the smaller second variation amount, wherein the variation amount change unit is operable to restore the variation amount associated with the designated value from the smaller second variation amount back to the predetermined first variation amount when the aggregate change in the designated value exceeds the predetermined first variation amount.

6. The input device of claim 1, wherein the designated value change unit changes the designated value using the smaller second variation amount when a designated value change directive is received from the operator after the variation amount associated with the designated value has been altered from the predetermined first variation amount to the smaller second variation amount.

7. The input device of claim 1, wherein the variation amount change unit is operable to alter the variation amount associated with the designated value from the smaller second variation amount to an even smaller third variation amount when a third designated value change directive that is opposite the second designated value change directive is received from the operator within the predetermined variation amount change period.

8. The input device of claim 1, wherein the variation amount change unit is operable to alter the variation amount associated with the designated value from the predetermined first variation amount to the smaller second variation amount after the second designated value change directive that is opposite the first designated value change directive, a third designated value change directive that is opposite the second designated value change directive, and a fourth designated value change directive that is opposite the third designated value change directive are received from the operator in sequence at intervals shorter than the predetermined variation amount change period.

9. The input device of claim 1, wherein the designated value represents the position of a pointer or the brightness of a screen.

10. An input method, the method comprising:
    storing a designated value, the designated value being associated with a variation amount;
    changing the designated value using a predetermined first variation amount when a first designated value change directive is received;
    altering the variation amount associated with the designated value from the predetermined first variation amount to a smaller second variation amount when a second designated value change directive that is opposite the first designated value change directive is received within a predetermined variation amount change period; and
    restoring the variation amount associated with the designated value from the smaller second variation amount back to the predetermined first variation amount when a variation amount retention period lapses after a previous designated value change directive is received.

11. The method of claim 10, further comprising:
    managing an aggregate change in the designated value when the variation amount associated with the designated value is altered from the predetermined first variation amount to the smaller second variation amount; and
    restoring the variation amount associated with the designated value from the smaller second variation amount back to the predetermined first variation amount when the aggregate change in the designated value exceeds the predetermined first variation amount.

12. The method of claim 10, further comprising:
    changing the designated value using the smaller second variation amount when a designated value change directive is received after the variation amount associated with the designated value has been altered from the predetermined first variation amount to the smaller second variation amount.

13. The method of claim 10, further comprising:
altering the variation amount associated with the designated value from the smaller second variation amount to an even smaller third variation amount when a third designated value change directive that is opposite the second designated value change directive is received within the predetermined variation amount change period.

14. The method of claim 10, further comprising:
altering the variation amount associated with the designated value from the predetermined first variation amount to the smaller second variation amount after the second designated value change directive that is opposite the first designated value change directive, a third designated value change directive that is opposite the second designated value change directive, and a fourth designated value change directive that is opposite the third designated value change directive are received in sequence at intervals shorter than the predetermined variation amount change period.

15. The method of claim 10, wherein the designated value represents the position of a pointer or the brightness of a screen.

16. A computer program product comprising:
a computer usable medium having a computer readable program, wherein the computer readable program when executed on a computer causes the computer to:
store a designated value, the designated value being associated with a variation amount;
change the designated value using a predetermined first variation amount when a first designated value change directive is received;
alter the variation amount associated with the designated value from the predetermined first variation amount to a smaller second variation amount when a second designated value change directive that is opposite the first designated value change directive is received within a predetermined variation amount change period; and
restore the variation amount associated with the designated value from the smaller second variation amount back to the predetermined first variation amount when a variation amount retention period lapses after a previous designated value change directive is received.

17. The computer program product of claim 16, wherein the computer readable program when executed on the computer further causes the computer to:
manage an aggregate change in the designated value when the variation amount associated with the designated value is altered from the predetermined first variation amount to the smaller second variation amount; and
restore the variation amount associated with the designated value from the smaller second variation amount back to the predetermined first variation amount when the aggregate change in the designated value exceeds the predetermined first variation amount.

18. The computer program product of claim 16, wherein the computer readable program when executed on the computer further causes the computer to:
change the designated value using the smaller second variation amount when a designated value change directive is received after the variation amount associated with the designated value has been altered from the predetermined first variation amount to the smaller second variation amount.

19. The computer program product of claim 16, wherein the computer readable program when executed on the computer further causes the computer to:
alter the variation amount associated with the designated value from the smaller second variation amount to an even smaller third variation amount when a third designated value change directive that is opposite the second designated value change directive is received within the predetermined variation amount change period.

20. The computer program product of claim 16, wherein the computer readable program when executed on the computer further causes the computer to:
alter the variation amount associated with the designated value from the predetermined first variation amount to the smaller second variation amount after the second designated value change directive that is opposite the first designated value change directive, a third designated value change directive that is opposite the second designated value change directive, and a fourth designated value change directive that is opposite the third designated value change directive are received in sequence at intervals shorter than the predetermined variation amount change period.

21. The computer program product of claim 16, wherein the designated value represents the position of a pointer or the brightness of a screen.

* * * * *